(12) United States Patent
Im et al.

(10) Patent No.: US 10,471,395 B2
(45) Date of Patent: Nov. 12, 2019

(54) HOLLOW FIBER MEMBRANE AND METHOD OF PREPARING THE SAME

(71) Applicant: LOTTE CHEMICAL CORPORATION, Seoul (KR)

(72) Inventors: Dong Jun Im, Daejeon (KR); Bum Jin Park, Daejeon (KR); Chang Min Seo, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 64 days.

(21) Appl. No.: 15/716,787

(22) Filed: Sep. 27, 2017

(65) Prior Publication Data

US 2018/0085713 A1 Mar. 29, 2018

(30) Foreign Application Priority Data

Sep. 27, 2016 (KR) .................. 10-2016-0124212

(51) Int. Cl.
| | |
|---|---|
| *B01D 69/08* | (2006.01) |
| *B01D 67/00* | (2006.01) |
| *B01D 69/02* | (2006.01) |
| *B01D 71/34* | (2006.01) |
| *C02F 1/44* | (2006.01) |

(52) U.S. Cl.
CPC ........ *B01D 69/081* (2013.01); *B01D 67/0011* (2013.01); *B01D 67/0027* (2013.01); *B01D 69/02* (2013.01); *B01D 69/08* (2013.01); *B01D 69/087* (2013.01); *B01D 71/34* (2013.01); *B01D 67/003* (2013.01); *B01D 67/0016* (2013.01); *B01D 2323/08* (2013.01); *B01D 2325/02* (2013.01); *B01D 2325/022* (2013.01); *B01D 2325/023* (2013.01); *B01D 2325/08* (2013.01); *B01D 2325/20* (2013.01); *B01D 2325/34* (2013.01); *C02F 1/444* (2013.01)

(58) Field of Classification Search
None
See application file for complete search history.

(56) References Cited

U.S. PATENT DOCUMENTS

| | | | | |
|---|---|---|---|---|
| 4,529,481 A | * | 7/1985 | Yoshida | B01D 39/1623 162/146 |
| 4,821,750 A | * | 4/1989 | Browne | A24D 3/10 131/340 |
| 5,232,597 A | * | 8/1993 | Eguchi | B01D 67/0011 210/500.23 |
| 7,780,014 B2 | | 8/2010 | Tada et al. | |
| 2007/0215540 A1 | * | 9/2007 | Tada | B01D 67/0011 210/500.23 |

(Continued)

FOREIGN PATENT DOCUMENTS

| | | | | |
|---|---|---|---|---|
| JP | H07171360 A | * | 7/1995 | .......... B01D 69/082 |
| KR | 20060134157 A | | 12/2006 | |

(Continued)

*Primary Examiner* — Krishnan S Menon
*Assistant Examiner* — Brad Gordon
(74) *Attorney, Agent, or Firm* — Osha Liang LLP

(57) ABSTRACT

A hollow fiber membrane and a method of preparing the same. The hollow fiber membrane has an inner surface and an outer surface, wherein the inner surface has a zebra-stripe pattern in which a dense portion and a porous portion are alternately formed in a longitudinal direction of the hollow fiber membrane.

16 Claims, 2 Drawing Sheets

(56) References Cited

U.S. PATENT DOCUMENTS

| | | | |
|---|---|---|---|
| 2008/0078718 A1* | 4/2008 | Tada | B01D 67/003 210/500.23 |
| 2011/0259816 A1* | 10/2011 | Yokota | B01D 69/087 210/500.23 |
| 2012/0174790 A1* | 7/2012 | Osabe | B01D 65/10 96/7 |
| 2012/0217199 A1* | 8/2012 | Muehlinghaus | B01D 61/38 210/323.1 |

FOREIGN PATENT DOCUMENTS

| | | | | |
|---|---|---|---|---|
| KR | 20140042261 A | | 4/2014 | |
| WO | WO-2014142394 A1 * | | 9/2014 | B01D 71/34 |

* cited by examiner

HOLLOW FIBER MEMBRANE AND METHOD OF PREPARING THE SAME

CROSS-REFERENCE TO RELATED APPLICATION

This application claims priority to and the benefit of Korean Patent Application No. 10-2014-0124212, filed on Sep. 27, 2016 in the Korean Intellectual Property Office, the entire content of which are incorporated herein by reference.

FIELD OF THE INVENTION

The present invention relates to a hollow fiber membrane and a method of preparing the same.

DESCRIPTION OF THE RELATED ART

With industrial development and population growth, interest in efficient water use and treatment technologies is increasing. Recently, in order to ensure stable water quality, use of various membranes has been increasing in the fields of water treatment, sewage treatment, and seawater desalination. Particularly, lots of research has been made into hollow fiber membranes because of their high surface area per unit volume, less contamination, and ease of cleaning.

Generally, physical and chemical treatments are performed to control contamination of membranes. However, these treatments can cause reduction of service life of the membranes. The membranes are required to have good water permeability in order to secure high filtration performance and efficiency.

Therefore, there is a need for a hollow fiber membrane which has good properties in terms of both water permeability and mechanical strength.

SUMMARY OF THE INVENTION

It is an object of the present invention to provide a hollow fiber membrane which has good properties in terms of both water permeability and mechanical strength, and a method of preparing the same.

One aspect of the present invention relates to a hollow fiber membrane.

The hollow fiber membrane has an inner surface and an outer surface, wherein the inner surface has a zebra-stripe pattern in which a dense portion and a porous portion are alternately formed in a longitudinal direction of the hollow fiber membrane.

The dense portion may have no pore having a diameter of about 0.08 μm or more, and the porous portion may have about 1 or more pores having a diameter of about 0.1 μm or more per about 5 μm².

An apparent area ratio of the porous portion to the dense portion may satisfy Equation 1:

about 0.25≤apparent area ratio (P/D)≤about 2.5 where P denotes an apparent area of the porous portion and D denotes an apparent area of the dense portion.

The porous portion may have an average pore diameter of about 0.1 μm to about 0.55 μm and the dense portion may have an average pore diameter of about 0.001 μm to about 0.05 μm.

The hollow fiber membrane may have a tensile strength of about 0.6 kgf/fiber or more.

The hollow fiber membrane may have a water permeability (flux) of about 430 LMH to about 3,000 LMH.

The hollow fiber membrane may have a membrane index of about 600 or more, as represented by Equation 2:

Membrane index=tensile strength (kgf/fiber)×water permeability (LMH)

The hollow fiber membrane may be a single membrane.

Another aspect of the present invention relates to a method of preparing a hollow fiber membrane.

The method includes: preparing a spinning solution using a composition comprising a vinylidene fluoride polymer resin and a first plasticizer having a viscosity of about 300 cP to about 4,000 cP; forming a pre-hollow fiber membrane by bringing the spinning solution into contact with a second plasticizer having a viscosity of about 300 cP to about 4,000 cP in a dual-concentric nozzle, and spraying and coagulating the spinning solution; extracting the first and second plasticizers from the pre-hollow fiber membrane; heat treating the pre-hollow fiber membrane; and stretching the pre-hollow fiber membrane subjected to heat treatment.

The first plasticizer and the second plasticizer may be the same kind of plasticizer.

Heat treatment of the pre-hollow fiber membrane may be performed at about 80° C. to about 150° C. for about 30 to 200 minutes.

Stretching of the pre-hollow fiber membrane subjected to heat treatment may be performed to an elongation of about 30% to about 200% at about 10° C. to about 50° C.

The composition may include about 10 wt % to about 60 wt % of the vinylidene fluoride polymer resin and about 40 wt % to about 90 wt % of the first plasticizer.

The vinylidene fluoride polymer resin may include at least one of a vinylidene fluoride homopolymer and a vinylidene fluoride copolymer.

The first plasticizer or the second plasticizer may include at least one of a polyester plasticizer, a phthalic acid plasticizer, an adipic acid plasticizer, and a trimellitic acid plasticizer.

The composition may further include a good solvent.

DETAILED DESCRIPTION OF THE INVENTION

Hereinafter, embodiments of the present invention will be described in detail.

Descriptions of known functions and constructions which may unnecessarily obscure the subject matter of the present invention will be omitted.

In addition, it will be understood that the terms "includes", "comprises", "including" and/or "comprising," when used in this specification do not preclude the presence or addition of one or more other features, steps, operations, elements, components, and/or groups. As used herein, the singular forms, "a," "an," and "the" are intended to include the plural forms as well, unless the context clearly indicates otherwise.

It should be understood that a numerical value related to a certain component is construed to include a tolerance range in interpretation of constituent components, unless clearly stated otherwise.

Herein, "X to Y", used to indicate the range of certain values, refers to "more than or equal to X and less than or equal to Y".

As used herein, "apparent area" is used to represent the area of a dense portion and/or a porous portion, and refers to an area of the dense portion in a hollow fiber membrane and/or an area of the porous portion in the hollow fiber membrane, without consideration of pores.

Hollow Fiber Membrane

Figure 1:
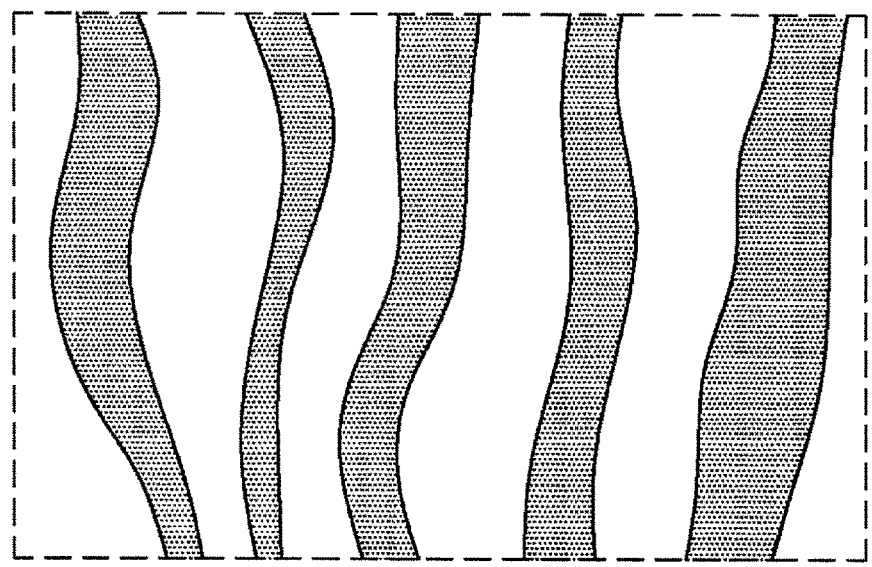
FIG. 1 is a schematic view of an inner surface of a hollow fiber membrane according to one embodiment of the present invention.

A hollow fiber membrane according to one embodiment of the present invention will be described with reference to FIG. 1. FIG. 1 is a schematic view of an inner surface of a hollow fiber membrane according to one embodiment of the present invention.

Referring to FIG. 1, a hollow fiber membrane according to this embodiment has an inner surface and an outer surface, wherein the inner surface has a zebra-stripe pattern in which a dense portion and a porous portion are alternately formed in a longitudinal direction of the hollow fiber membrane. Although the zebra-stripe pattern is shown by way of example in FIG. 1, it should be understood that the present invention is not limited thereto. Specifically, the dense portion and/or the porous portion may have a band shape extending in the longitudinal direction and may be alternately formed in the longitudinal direction. The band shape may include at least one branched band. The branched band may connect adjacent dense portions or adjacent porous portions to one another.

Generally, a hollow fiber membrane includes pores on a surface thereof to remove pollutants and allow purified water to permeate therethrough. As porosity of the hollow fiber membrane is increased, strength of the hollow fiber membrane decreases despite increase in water permeability. As a result, the hollow fiber membrane is likely to be damaged during operation and cleaning or to be shortened in service life. As the porosity of the hollow fiber membrane is decreased, water permeability of the hollow fiber membrane decreases despite increase in strength and service life. Adjustment of porosity of the hollow fiber membrane or change in material for the hollow fiber membrane has a limit in improvement in water permeability, strength, and service life of the hollow fiber membrane.

According to the present invention, the inner surface of the hollow fiber membrane advantageously has the zebra-stripe pattern in which the dense portion and the porous portion are alternately formed in the longitudinal direction of the hollow fiber membrane, thereby improving water permeability, strength and service life of the hollow fiber membrane. Specifically, the dense portion has a minimized number of pores to increase mechanical strength of the hollow fiber membrane, and the porous portion has a large number of pores to improve water permeability.

The hollow fiber membrane may be a single membrane, without being limited thereto.

The dense portion may have no pore having a diameter of about 0.08 μm or more, specifically about 0.1 μm or more. The porous portion may have about 1 or more, for example, about 1 to about 100, specifically about 3 to about 95, more specifically about 5 to about 90, still more specifically about 10 to about 80 pores having a diameter of about 0.1 μm per 5 μm². Within these ranges, the hollow fiber membrane can have good balance between water permeability and strength.

Here, the number of pores having specified diameters may be measured using a scanning electron microscope.

The hollow fiber membrane may have an apparent area ratio of the porous portion to the dense portion satisfying Equation 1:

$$\text{About } 0.25 \leq \text{apparent area ratio } (P/D) \leq \text{about } 2.5 \quad \text{<Equation 1>}$$

where P denotes an apparent area of the porous portion, and D denotes an apparent area of the dense portion.

In some embodiments, the apparent area ratio (P/D) may be about 0.25, 0.30, 0.40, 0.50, 0.60, 0.70, 0.80, 0.90, 1.0, 1.1, 1.2, 1.3, 1.4, 1.5, 1.6, 1.7, 1.8, 1.9, 2.0, 2.1, 2.2, 2.3, 2.4, or 2.5. In addition, the apparent area ratio (P/D) may range from one of the numerical values set forth above to another numerical value set forth above. For example, the apparent area ratio (P/D) may range from about 0.25 to about 2.5, specifically about 0.4 to about 1.5, more specifically about 0.5 to about 1. Within this range of apparent area ratio, the hollow fiber membrane can have good properties in terms of water permeability, strength, and service life.

The porous portion may have an average pore diameter of about 0.10 μm, 0.15 μm, 0.20 μm, 0.25 μm, 0.30 μm, 0.35 μm, 0.40 μm, 0.45 μm, 0.50 μm, or 0.55 μm. In addition, the porous portion may have an average pore diameter ranging from one of the numerical values set forth above to another numerical value set forth above. For example, the porous portion may have an average pore diameter of about 0.10 μm to about 0.55 μm, specifically, about 0.15 μm to about 0.40 μm.

The dense portion may have an average pore diameter of about 0.001, 0.005, 0.01, 0.02, 0.03, 0.04, or 0.05 μm. In addition, the dense portion may have an average pore diameter ranging from one of the numerical values set forth above to another numerical value set forth above. For example, the dense portion may have an average pore diameter of about 0.05 μm or less, for example, about 0.001 μm to about 0.05 μm, specifically, about 0.001 μm to about 0.03 μm. Within these ranges of average pore diameter, the hollow fiber membrane can have good properties in terms of water permeability and water treatment efficiency.

The hollow fiber membrane may have a tensile strength of about 0.6 kgf/fiber, 0.7 kgf/fiber, 0.8 kgf/fiber, 0.9 kgf/fiber, 1.0 kgf/fiber, 1.1 kgf/fiber, 1.2 kgf/fiber, 1.3 kgf/fiber, 1.4 kgf/fiber, 1.5 kgf/fiber, 1.6 kgf/fiber, 1.7 kgf/fiber, or 1.8 kgf/fiber. In addition, the hollow fiber membrane may have tensile strength ranging from one of the numerical values set forth above to another numerical value set forth above. For example, the hollow fiber membrane may have a tensile strength of about 0.6 kgf/fiber or more, for example, about 0.6 kgf/fiber to about 1.8 kgf/fiber, specifically about 0.8 kgf/fiber to about 1.7 kgf/fiber, more specifically about 1 kgf/fiber to about 1.6 kgf/fiber. Within this range of tensile strength, it is possible to minimize cleaning-induced damage of the hollow fiber membrane and to prolong service life of the hollow fiber membrane.

The hollow fiber membrane may have a water permeability (flux) of 430 LMH, 440 LMH, 450 LMH, 460 LMH, 470 LMH, 480 LMH, 490 LMH, 500 LMH, 550 LMH, 600 LMH, 650 LMH, 700 LMH, 750 LMH, 800 LMH, 850 LMH, 900 LMH, 950 LMH, 1,000 LMH, 1,100 LMH, 1,200 LMH, 1,300 LMH, 1,400 LMH, 1,500 LMH, 1,600 LMH, 1,700 LMH, 1,800 LMH, 1,900 LMH, 2,000 LMH, 2,100 LMH, 2,200 LMH, 2,300 LMH, 2,400 LMH, 2,500 LMH, 2,600 LMH, 2,700 LMH, 2,800 LMH, 2,900 LMH, or 3,000 LMH. In addition, the hollow fiber membrane may have a water permeability (flux) ranging from one of the numerical values set forth above to another numerical value set forth above. For example, the hollow fiber membrane may have a water permeability (flux) of about 430 LMH to about 3,000 LMH, specifically, about 500 LMH to about 2,000 LMH, more specifically about 800 LMH to about 1,500 LMH.

The hollow fiber membrane according to the present invention has good properties in terms of tensile strength and water permeability. Specifically, the hollow fiber membrane may have a membrane index of about 600, 700, 800, 900, 1,000, 1,100, 1,200, 1,300, 1,400, or 1,500, as represented by Equation 2. In addition, the hollow fiber membrane may have a membrane index ranging from one of the numerical values set forth above to another numerical value set forth above, as represented by Equation 2. For example, the hollow fiber membrane may have a membrane index of about 600 or more, for example, about 600 to about 1,500, specifically about 650 to about 1,300, as represented by Equation 2. Here, the membrane index is a product of tensile strength (kgf/fiber) and water permeability (LMH) and may be represented in kgf·LMH/fiber.

Membrane index=tensile strength (kgf/fiber)×water permeability (LMH)  <Equation 2>

Method of Preparing Hollow Fiber Membrane

In accordance with another aspect of the present invention, a method of preparing a hollow fiber membrane includes: preparing a spinning solution using a composition including a vinylidene fluoride polymer resin and a first plasticizer having a viscosity of about 300 cP to about 4,000 cP; forming a pre-hollow fiber membrane by bringing the spinning solution into contact with a second plasticizer having a viscosity of about 300 cP to about 4,000 cP in a dual-concentric nozzle, and spraying and coagulating the spinning solution; extracting the first and second plasticizers from the pre-hollow fiber membrane; heat treating the pre-hollow fiber membrane; and stretching the pre-hollow fiber membrane subjected to heat treatment.

In a typical method of preparing a hollow fiber membrane, a gas such as nitrogen gas or a liquid (a good solvent, a poor solvent, or a combination thereof) is used as an internal coagulant. However, this method has a problem in that porosity of an inner surface of the hollow fiber membrane is increased, causing reduction in mechanical strength.

In the method according to the present invention, the second plasticizer used as a hollowing agent has a viscosity of about 300 cP to about 4,000 cP, specifically about 1,000 cP to about 3,500 cP, more specifically about 2,000 cP to about 3,000 cP. Within this range, the second plasticizer remains in a minute quantity on the surface of the hollow fiber membrane even after extraction of the first and second plasticizers. The second plasticizer melts the vinylidene fluoride polymer on an inner surface of the hollow fiber membrane during heat treatment and then allows a dense portion and a porous portion to be alternately formed in the longitudinal direction of the hollow fiber membrane so as to form a stripe pattern during the stretching process. As a result, the hollow fiber membrane can have good properties in terms of water permeability, strength, and service life.

Now, each step of the method will be described in detail.

In one embodiment, the hollow fiber membrane preparation method may include preparing the spinning solution using the composition including the vinylidene fluoride polymer resin and the first plasticizer having a viscosity of about 300 cP to about 4,000 cP, specifically about 1,000 to about 3,500 cP, more specifically about 2,000 cP to about 3,000 cP.

In the composition, the vinylidene fluoride polymer resin may be present in an amount of about 10 wt % to about 60 wt %, specifically about 20 wt % to about 50 wt %, more specifically about 20 wt % to about 40 wt %, and the first plasticizer may be present in an amount of about 40 wt % to about 90 wt %, specifically about 50 wt % to about 80 wt %, more specifically about 60 wt % to about 80 wt %. Within these ranges, the composition can be suited to formation of a hollow fiber membrane and can improve water permeability and strength of the hollow fiber membrane.

The vinylidene fluoride polymer resin may include at least one of a vinylidene fluoride homopolymer and a vinylidene fluoride copolymer. Specifically, the vinylidene fluoride polymer resin may include at least one of ethylene tetrafluoride, propylene hexafluoride, ethylene trifluoride, and ethylene trifluoride chloride copolymers.

The vinylidene fluoride polymer resin may have a weight average molecular weight of about 100,000 to about 1,000,000, specifically about 250,000 to about 800,000, more specifically about 300,000 to about 600,000. Within this range, the vinylidene fluoride polymer resin can improve balance between mechanical strength and viscosity.

The first plasticizer serves to melt the vinylidene fluoride polymer resin at high temperature. The first plasticizer may have a viscosity of about 300 cP to about 4,000 cP, specifically about 1,000 cP to about 3,700 cP, more specifically about 2,000 cP to about 3,500 cP. Within this range, a hollow fiber membrane prepared from the composition can have good properties in terms of porosity and mechanical strength.

The first plasticizer may include at least one of a polyester plasticizer, a phthalic acid plasticizer, an adipic acid plasticizer, and a trimellitic acid plasticizer. Preferably, the first plasticizer includes a polyester plasticizer to improve porosity and strength of the hollow fiber membrane.

The polyester plasticizer may be a polyester containing a dicarboxylic acid and a diol as repeat units. The polyester plasticizer may have a weight average molecular weight of about 500 to about 4,000, specifically about 1,500 to about 3,500. Within this range of weight average molecular weight, the polyester plasticizer can advantageously improve porosity and strength of the hollow fiber membrane.

The dicarboxylic acid may be a linear and/or cyclic aliphatic dicarboxylic acid. Specifically, the dicarboxylic acid may be a $C_1$ to $C_{20}$ linear alkylene group- or $C_3$ to $C_{20}$ branched alkylene group-containing dicarboxylic acid. For example, the $C_1$ to $C_{20}$ linear alkylene group- or $C_3$ to $C_{20}$ branched alkylene group-containing dicarboxylic acid may include ethylene dicarboxylic acid, 1,3-propane-dicarboxylic acid, 1,3-butane dicarboxylic acid, 1,4-butane dicarboxylic acid, 1,4-pentane dicarboxylic acid, 1,5-pentane dicarboxylic acid, 1,6-hexane dicarboxylic acid, 3-methylpentane-2,4-dicarboxylic acid, 2-methylpentane-1,4-dicarboxylic acid, 2,2,4-trimethylpentane-1,3-dicarboxylic acid, 2-ethylhexane-1,3-dicarboxylic acid, and 2,2-diethylpropane-1,3-dicarboxylic acid, without being limited thereto.

The diol may include a $C_1$ to $C_{20}$ linear alkylene group- or $C_3$ to $C_{20}$ branched alkylene group-containing diol. For example, the $C_1$ to $C_{20}$ linear alkylene group- or $C_3$ to $C_{20}$ branched alkylene group-containing diol may include ethylene glycol, 1,3-propane-diol, 1,3-butanediol, 1,4-butanediol, 1,4-pentanediol, 1,5-pentanediol, 1,6-hexanediol, 3-methylpentane-2,4-diol, 2-methylpentane-1,4-diol, 2,2,4-trimethylpentane-1,3-diol, 2-ethylhexane-1,3-diol, and 2,2-diethylpropane-1,3-diol, without being limited thereto.

In one embodiment, the polyester plasticizer may be a polymer of adipic acid and 1,3-butanediol.

In another embodiment, the composition may further include a good solvent. The good solvent may include any typical good solvent capable of dissolving the polyvinylidene fluoride resin. For example, the good solvent may include at least one of n-methyl-2-pyrrolidone, dimethylformamide, n,n'-dimethyl acetamide, dimethylsulfoxide, and hexamethylphosphoric triamide.

The composition may be heated to about 150° C. to about 250° C., specifically about 180° C. to about 220° C. to be converted into a spinning solution which can be used to fabricate a hollow fiber membrane. Within this range of heating temperature, the spinning solution can have a suitable viscosity for spinning and form a sufficient number of uniform pores through the hollow fiber membrane, and the components of the composition can be prevented from being decomposed. Here, heating may be carried out under a nitrogen atmosphere for about 2 to 8 hours, specifically about 2 to 6 hours while stirring.

The spinning solution may be subjected to defoaming for about 5 to 30 minutes. After defoaming, the spinning solution may be pressurized with nitrogen for a predetermined period of time to stabilize the pressure of the solution.

In one embodiment, the method may include forming the pre-hollow fiber membrane by bringing the spinning solution into contact with the second plasticizer having a viscosity of about 300 cP to about 4,000 cP in a dual-concentric nozzle, and spraying and coagulating the spinning solution. The second plasticizer melts the vinylidene fluoride polymer on an inner surface of the hollow fiber membrane during heat treatment and then allows a dense portion and a porous portion to be alternately formed in the longitudinal direction of the hollow fiber membrane so as to form a stripe pattern during the stretching process. As a result, the hollow fiber membrane can have good properties in terms of water permeability, strength, and service life.

The second plasticizer may be substantially the same kind of plasticizer as the first plasticizer, or may be a different plasticizer which has a similar viscosity and composition to the first plasticizer.

In one embodiment, the second plasticizer may be the same kind of plasticizer as the first plasticizer. When the first plasticizer and the second plasticizer are the same kind of plasticizer, the vinylidene fluoride polymer can be effectively melted by the second plasticizer during subsequent heat treatment, and extraction of the first and plasticizers can be facilitated.

In order to spray the spinning solution, the spinning nozzle may be connected to a spinning solution delivery line and may also be connected to a peristaltic pump for pushing the spinning solution or a nitrogen gas line. The spinning nozzle may have a temperature of about 150° C. to about 220° C. or a spinning solution temperature±about 30° C.

Once the spinning solution is stabilized, the spinning solution is required to be pushed by the peristaltic pump at a constant flow rate or to be pressurized to a constant pressure by opening a nitrogen gas valve. Generally, a discharge rate of the spinning solution depends on the peristaltic pump and may be adjusted depending upon desired physical properties and characteristics of a hollow fiber membrane fabricated using the solution. For example, the spinning solution may be discharged at a rate of about 1 g to about 50 g per minute.

The spinning solution may be sprayed to a wet coagulation bath through the spinning nozzle, thereby forming the pre-hollow fiber membrane.

The wet coagulation bath is filled with water, and the wet coagulation bath or the water may be maintained at about 0° C. to about 60° C.

A distance between the spinning nozzle and a surface of the water in the wet coagulation bath may range from about 0.5 cm to about 50 cm. Here, the distance may correspond to a space (air gap) in which the spinning solution is exposed to air.

The pre-hollow fiber membrane may be subjected to cleaning in a cleaning bath at about 10° C. to about 40° C.

In one embodiment, the method may include extracting the first and second plasticizers from the pre-hollow fiber membrane. Specifically, the pre-hollow fiber membrane may be dipped in an extraction bath filled with a solvent highly compatible with the first and second plasticizers at room temperature for about 12 to 60 hours, thereby extracting the plasticizers and/or the good solvent from the pre-hollow fiber membrane.

The solvent for extraction of the first and second plasticizers may include any typical solvent having high compatibility with the first and second plasticizers. For example, the solvent may include at least one of dichloromethane, ethyl alcohol, and isopropyl alcohol.

In one embodiment, the method may include heat treating the pre-hollow fiber membrane. When the viscosity of the first plasticizer and/or the second plasticizer falls within the range according to the present invention, the first plasticizer and/or the second plasticizer can remain in a minute quantity on the surface of the pre-hollow fiber membrane even after the extraction process. During heat treatment of the pre-hollow fiber membrane, the first plasticizer and/or the second plasticizer can melt the vinylidene fluoride polymer to form a hollow fiber membrane having a highly compact inner surface.

Here, heat treatment may be performed at about 80° C. to about 150° C., specifically about 80° C. to about 130° C. for about 1 to 120 minutes, specifically about 5 to 60 minutes. When heat treatment is performed under these conditions, the hollow fiber membrane can have high crystallinity without being damaged by heat and thus can have a compact inner surface.

In one embodiment, the method may include stretching the pre-hollow fiber membrane subjected to heat treatment. The pre-hollow fiber membrane subjected to heat treatment and having the highly compact inner surface may be stretched to obtain a hollow fiber membrane having a dense portion and a porous portion alternately formed on an inner surface thereof in the longitudinal direction to form a stripe pattern.

Here, stretching may be dry stretching. In this case, the hollow fiber membrane can have good properties in terms of mechanical strength and water permeability. Dry stretching may be performed by inter-roll stretching, heating roll stretching, compression stretching or tenter stretching, or batch jig stretching.

Inter-roll stretching refers to a process in which the coagulated composition is passed through two pairs of rollers having different rotational speeds. In addition, batch jig stretching refers to a process in which a PVDF hollow fiber membrane precursor is secured to a pair of jigs, followed by moving one or both of the pair of jigs in a direction away from one another. Heating roll stretching and compression stretching or tenter stretching may be carried out by any suitable method generally known in the art.

Specifically, dry stretching may be performed by forcing the coagulated composition to pass through two pairs of rollers having different rotational speeds. Here, the coagulated composition may be stretched to an elongation of about 30% to about 200% at a rate of about 3 to about 20 m/min at a temperature of about 10° C. to about 50° C. The coagulated composition may be stretched at a rate of about 3 to about 20 m/min. Specifically, the coagulated composition may be stretched to an elongation of about 30% to about 200%, more specifically about 50% to about 200%. Under these conditions, the coagulated composition can be stretched in a stable manner.

Further, the hollow fiber membrane prepared by the method according to this embodiment may be subjected to hydrothermal treatment to remove residual solvent and the like. Here, hydrothermal treatment may include dipping the hollow fiber membrane in ethanol at room temperature or in water at about 40° C.

In one embodiment, the hollow fiber membrane preparation method may further include drying the prepared hollow fiber membrane.

Next, the present invention will be described in more detail with reference to some examples. However, it should be noted that these examples are provided for illustration only and are not to be construed in any way as limiting the present invention. In addition, descriptions of details apparent to those skilled in the art will be omitted for clarity.

EXAMPLE

Example 1

Figure 2:
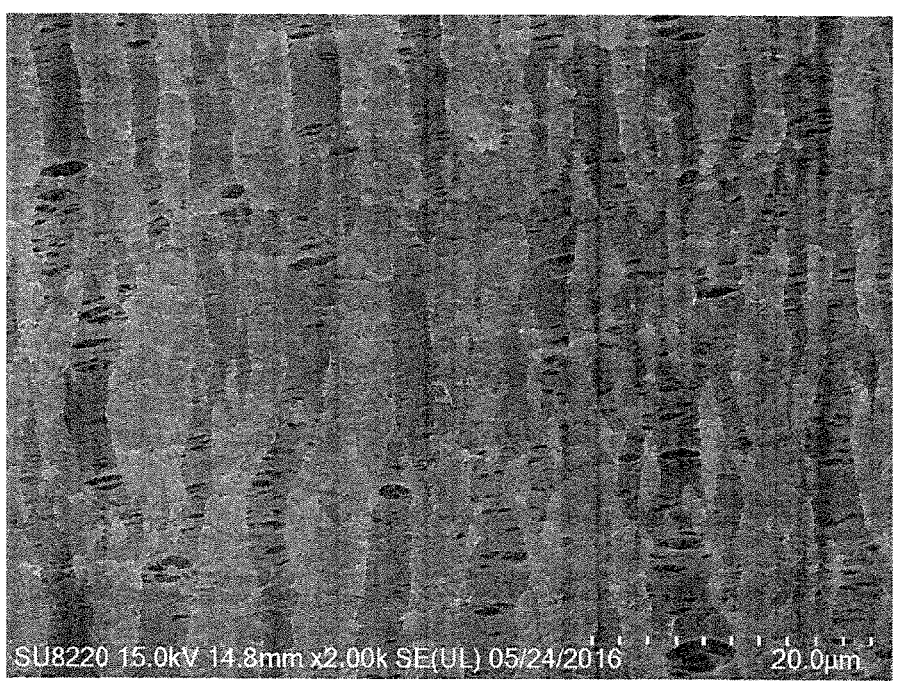
FIG. 2 is an electron micrograph (×2,000 magnification) of an inner surface of a hollow fiber membrane prepared in Example 1.

A polymer resin composition for hollow fiber membranes including 30 wt % of a polyvinylidene fluoride resin (PVDF) and 70 wt % of an adipic acid polyester plasticizer, as a first plasticizer, were stirred in a tank-type reactor at 200° C. for 3 hours, thereby preparing a spinning solution. The prepared spinning solution was transferred to a nozzle together with an adipic polyester plasticizer, as a second plasticizer. Here, the second plasticizer was the same kind of plasticizer as the first plasticizer and had a viscosity of 2500 cP. The second plasticizer was discharged through an inner tube of a dual-concentric spinning nozzle, and the spinning solution was discharged through an outer tube of the dual-concentric spinning nozzle. The spinning solution having a temperature of 200° C. was discharged into a coagulation bath through the spinning nozzle at 190° C. The coagulation bath was filled with water to a height of 5 cm and maintained at 5° C., and the height of the nozzle was 5 cm. The spinning solution was converted into a pre-hollow fiber membrane through phase change, which in turn was passed through a cleaning bath and wound into a roll on a rear stage. The prepared pre-hollow fiber membrane was dipped in a dichloromethane solution for 24 hours to extract the first and second plasticizers, followed by heat treatment at 120° C. for 1 hour, and then dry-stretched to an elongation of 100% at room temperature, thereby preparing a hollow fiber membrane. An electron micrograph (×2,000 magnification) of an inner surface of the fabricated hollow fiber membrane is shown in FIG. 2.

Example 2

A hollow fiber membrane was prepared in the same manner as in Example 1 except that the coagulation bath was maintained at 40° C.

Example 3

A hollow fiber membrane was prepared in the same manner as in Example 1 except that the spinning solution included 30 wt % of a polyvinylidene fluoride resin (PVDF), 7 wt % of n-methyl-pyrrolidone, and 63 wt % of an adipic acid polyester plasticizer, as the first plasticizer, and the coagulation bath was maintained at 40° C.

Comparative Example 1

Figure 3:
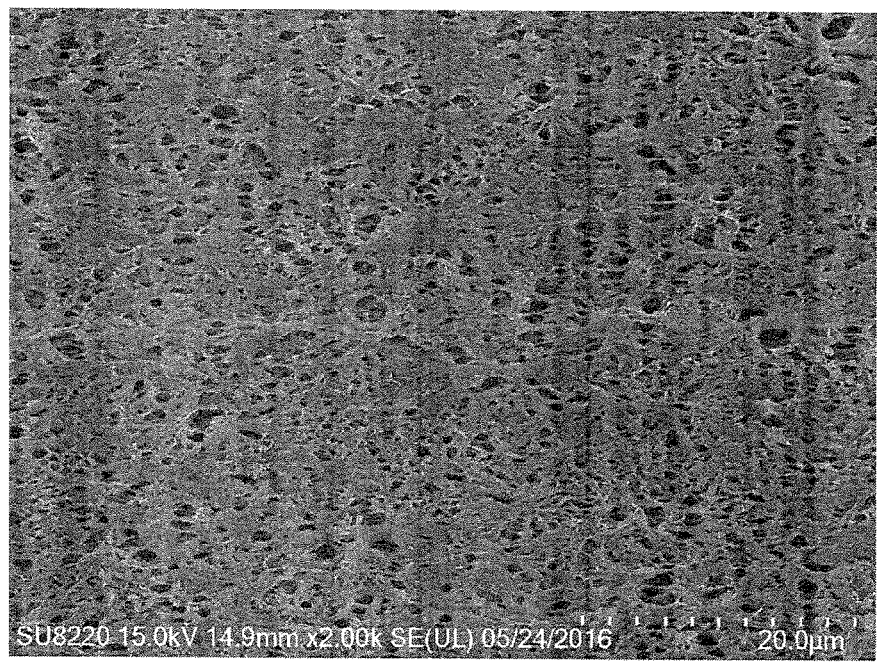
FIG. 3 is an electron micrograph (×2,000 magnification) of an inner surface of a hollow fiber membrane prepared in Comparative Example 1.

A hollow fiber membrane was prepared in the same manner as in Example 1 except that air was injected through the inner tube of the spinning nozzle without using the second plasticizer. An electron micrograph (×2,000 magnification) of an inner surface of the hollow fiber membrane is shown in FIG. 3.

Property Evaluation

1) Apparent area ratio (P/D): Using a scanning electron micrograph of an inner surface of a hollow fiber membrane, the apparent area (D) of a dense portion of the inner surface and the apparent area (P) of a porous portion of the inner surface were measured, followed by calculating an apparent area ratio (P/D). Results are shown in Table 1.

2) Water permeability (LMH): A hollow fiber membrane was placed in a 20 mm acrylic tube and potted with epoxy, followed by measurement of a net permeate flow rate per hour, thereby determining water permeability per unit membrane area. Results are shown in Table 1. Here, the net water permeability was measured by dead-end filtration method through application of a pressure of 1 bar.

3) Tensile strength (kgf/fiber) and elongation (%): Tensile strength and elongation were measured using an Instron testing machine. In measurement, one strand of a hollow fiber membrane was held by a gripper and pulled at a rate of 50 mm/min. Results are shown in Table 1.

4) Membrane index: Membrane index was calculated according to Equation 2. Results are shown in Table 1.

$$\text{Membrane index} = \text{tensile strength (kgf/fiber)} \times \text{water permeability (LMH)} \qquad \text{<Equation 2>}$$

TABLE 1

|  | Example 1 | Example 2 | Example 3 | Comparative Example 1 |
|---|---|---|---|---|
| Internal coagulant | Adipic acid polyester | Adipic acid polyester | Adipic acid polyester | Air |
| Apparent area ratio (P/D) | 0.37 | 0.81 | 1.7 | — |
| Temperature of coagulation bath | 5° C. | 40° C. | 40° C. | 5° C. |
| Stretching ratio | 100% | 100% | 100% | 100% |
| Water permeability (LMH) | 445 | 703 | 931 | 415 |
| Tensile strength (kgf/fiber) | 1.47 | 1.15 | 0.88 | 0.95 |
| Membrane index | 654.15 | 808.45 | 819.28 | 394.25 |
| Elongation (%) | 207 | 120 | 107 | 185 |

As shown in Table 1, it can be seen that the hollow fiber membranes of Examples 1 to 3 each having a dense portion and a porous portion alternately formed on an inner surface thereof in the longitudinal direction to form a stripe pattern exhibited good properties in terms of both water permeability and tensile strength and had a high membrane index. Conversely, it can be seen that the hollow fiber membrane of Comparative Example 1 exhibited poor properties in terms of water permeability and tensile strength.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention. Therefore, the scope of the invention should be limited only by the accompanying claims and equivalents thereof.

| <List of Reference Numerals> | |
| --- | --- |
| 10: dense portion | 20: porous portion |

What is claimed is:

1. A hollow fiber membrane having an inner surface and an outer surface, wherein the inner surface has a zebra-stripe pattern in which a dense portion and a porous portion are alternately formed in a longitudinal direction of the hollow fiber membrane.

2. The hollow fiber membrane according to claim 1, wherein the dense portion has no pore having a diameter of about 0.08 μm or more, and the porous portion has about 1 or more pores having a diameter of about 0.1 μm or more per about 5 μm$^2$.

3. The hollow fiber membrane according to claim 1, wherein an apparent area ratio of the porous portion to the dense portion satisfies Equation 1:

about 0.25≤apparent area ratio (P/D)≤about 2.5 where P denotes an apparent area of the porous portion and D denotes an apparent area of the dense portion.

4. The hollow fiber membrane according to claim 1, wherein the porous portion has an average pore diameter of about 0.1 μm to about 0.55 μm and the dense portion has an average pore diameter of about 0.001 μm to about 0.05 μm.

5. The hollow fiber membrane according to claim 1, wherein the hollow fiber membrane has a tensile strength of about 0.6 kgf/fiber or more.

6. The hollow fiber membrane according to claim 1, wherein the hollow fiber membrane has a water permeability (flux) of about 430 LMH to about 3,000 LMH.

7. The hollow fiber membrane according to claim 1, wherein the hollow fiber membrane has a membrane index of about 600 or more, as represented by Equation 2:

Membrane index=tensile strength (kgf/fiber)×water permeability (LMH).

8. The hollow fiber membrane according to claim 1, wherein the hollow fiber membrane is a single membrane.

9. A method of preparing a hollow fiber membrane, comprising:

preparing a spinning solution using a composition comprising a vinylidene fluoride polymer resin and a first plasticizer having a viscosity of about 300 cP to about 4,000 cP;

forming a pre-hollow fiber membrane by bringing the spinning solution into contact with a second plasticizer having a viscosity of about 300 cP to about 4,000 cP in a dual-concentric nozzle, and spraying and coagulating the spinning solution;

extracting the first and second plasticizers from the pre-hollow fiber membrane;

heat treating the pre-hollow fiber membrane; and stretching the pre-hollow fiber membrane subjected to heat treatment.

10. The method of preparing a hollow fiber membrane according to claim 9, wherein the first plasticizer and the second plasticizer are the same kind of plasticizer.

11. The method of preparing a hollow fiber membrane according to claim 9, wherein heat treatment of the pre-hollow fiber membrane is performed at about 80° C. to about 150° C. for about 30 to 200 minutes.

12. The method of preparing a hollow fiber membrane according to claim 9, wherein stretching of the pre-hollow fiber membrane subjected to heat treatment is performed to an elongation of about 30% to about 200% at about 10° C. to about 50° C.

13. The method of preparing a hollow fiber membrane according to claim 9, wherein the composition comprises about 10 wt % to about 60 wt % of the vinylidene fluoride polymer resin and about 40 wt % to about 90 wt % of the first plasticizer.

14. The method of preparing a hollow fiber membrane according to claim 9, wherein the vinylidene fluoride polymer resin comprises at least one of a vinylidene fluoride homopolymer and a vinylidene fluoride copolymer.

15. The method of preparing a hollow fiber membrane according to claim 9, wherein the first plasticizer or the second plasticizer comprises at least one of a polyester plasticizer, a phthalic acid plasticizer, an adipic acid plasticizer, and a trimellitic acid plasticizer.

16. The method of preparing a hollow fiber membrane according to claim 9, wherein the composition further comprises a good solvent.

* * * * *